(12) United States Patent
Hung et al.

(10) Patent No.: US 10,768,717 B2
(45) Date of Patent: Sep. 8, 2020

(54) METHOD FOR OPERATING HANDHELD DEVICE, HANDHELD DEVICE AND COMPUTER-READABLE RECORDING MEDIUM THEREOF

(71) Applicant: HTC Corporation, Taoyuan (TW)

(72) Inventors: Yu-Cheng Hung, Taoyuan (TW);
Shuo-Fang Jeng, Taoyuan (TW);
Shih-Lung Lin, Taoyuan (TW);
Pei-Chun Tsai, Taoyuan (TW);
Kuan-Wei Li, Taoyuan (TW);
Sheng-Chieh Lin, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 16/199,236

(22) Filed: Nov. 26, 2018

(65) Prior Publication Data

US 2019/0361557 A1 Nov. 28, 2019

Related U.S. Application Data

(60) Provisional application No. 62/663,212, filed on Apr. 26, 2018.

(51) Int. Cl.
*G06F 3/0346* (2013.01)
*G06F 3/041* (2006.01)
(Continued)

(52) U.S. Cl.
CPC ........ *G06F 3/0346* (2013.01); *G06F 3/03548* (2013.01); *G06F 3/041* (2013.01);
(Continued)

(58) Field of Classification Search
CPC .... G06F 3/0346; G06F 3/03548; G06F 3/041; G06F 3/0414; G06F 3/04886; G06F 2203/04105
See application file for complete search history.

(56) References Cited

U.S. PATENT DOCUMENTS

2002/0158838 A1* 10/2002 Smith ................... G06F 1/1616
345/156
2010/0134423 A1* 6/2010 Brisebois ............ G06F 3/03547
345/173
(Continued)

FOREIGN PATENT DOCUMENTS

CN 106168877 11/2016

OTHER PUBLICATIONS

"Xiaomi Mi4C (In-Depth Review) Edge Tap & USB Type-C—Video by s7yler," posted on Oct. 14, 2015, Available at: https://www.youtube.com/watch?v=UH9dryQvM6o.
(Continued)

*Primary Examiner* — Ariel A Balaoing
(74) *Attorney, Agent, or Firm* — JCIPRNET

(57) ABSTRACT

A method for operating a handheld device, a handheld device, and a computer-readable recording medium thereof are provided. The handheld device at least includes, but not limited to, a body, one or more sensors, a display, and a processor. The one or more sensors are disposed on at least one side of the body, respectively. The processor is coupled to the one or more sensors and the display and configured to receive an operation through the one or more sensors, determine a position of the operation on at least one side of the body according to sensing data generated by the sensors, and display a user interface corresponding to the position by the display. Accordingly, a convenient function for one hand operation is provided.

18 Claims, 12 Drawing Sheets

(51) Int. Cl.
*G06F 3/0354* (2013.01)
*G06F 3/0488* (2013.01)

(52) U.S. Cl.
CPC ........ *G06F 3/0414* (2013.01); *G06F 3/04886* (2013.01); *G06F 2203/04105* (2013.01)

(56) References Cited

U.S. PATENT DOCUMENTS

| | | | | |
|---|---|---|---|---|
| 2010/0262928 | A1* | 10/2010 | Abbott | H04M 1/72552 715/769 |
| 2011/0084914 | A1* | 4/2011 | Zalewski | G06F 3/0426 345/173 |
| 2011/0087963 | A1* | 4/2011 | Brisebois | G06F 3/03547 715/702 |
| 2013/0203469 | A1* | 8/2013 | Cho | G06F 3/04886 455/566 |
| 2014/0337791 | A1* | 11/2014 | Agnetta | G06F 3/0346 715/784 |
| 2018/0164987 | A1* | 6/2018 | Murphy | G06F 3/04845 |

OTHER PUBLICATIONS

"Hands on: Xiaomi Mi 4c—Now This Is a Flagship," accessed on Nov. 22, 2018, Available at: https://www.lowyat.net/2015/75896/hands-on-xiaomi-mi-4c-now-this-is-a-flagship/.

\* cited by examiner

METHOD FOR OPERATING HANDHELD DEVICE, HANDHELD DEVICE AND COMPUTER-READABLE RECORDING MEDIUM THEREOF

CROSS-REFERENCE TO RELATED APPLICATION

This application claims the priority benefit of U.S. provisional application Ser. No. 62/663,212, filed on Apr. 26, 2018. The entirety of the above-mentioned patent application is hereby incorporated by reference herein and made a part of this specification.

BACKGROUND OF THE INVENTION

1. Field of the Invention

The present disclosure relates to a method for operating a handheld device, a handheld device, and a computer-readable recording medium thereof, and more particularly, relates to a handheld device being operated through one or more sensors disposed on at least one side of the handheld device.

2. Description of Related Art

Handheld device such as mobile phone, tablet PC and the like are popular and being used in all kind of occasions. People may use the handheld device for playing multimedia, web browsing, navigation, gaming, and etc. With a significant breakthrough in the display technology, lots of manufactories trend to design handheld devices with slim bezel, so as to increase screen-to-body ratios of the handheld devices and provide better visual experience to users. The plus-sized handheld device might be a great fit for media consumption, but the large screen makes one-hand operating inconvenient. Accordingly, one hand experience for handheld devices should be improved.

SUMMARY OF THE INVENTION

Accordingly, the present invention is directed to a method for operating a handheld device, a handheld device, and a computer-readable recording medium thereof, which detects an operation by one or more sensors disposed on at least one long-side of the handheld device, and provides a corresponding user interface for a specific hand.

In one of the exemplary embodiments, the handheld device at least includes, but not limited to, a body, one or more sensors, a display, and a processor. The one or more sensors are disposed on at least one side of the body, respectively. The processor is coupled to the one or more sensors and the display. The processor is configured to receive an operation through the one or more sensors, determine a position of the operation on the at least side of the body according to sensing data generated by the sensors, and display a user interface corresponding to the position by the display. The user interface includes multiple icons.

According to one of the exemplary embodiments, the sensors are disposed on a first side and a second side of the at least one side, the first side is opposite to the second side. The processor is configured to determine the operation performs on the first side or the second side according to sensing data generated by the sensors, and display the user interface adjacent to the first side in response to a determination that the operation performs on the first side, or displaying the user interface adjacent to the second side in response to a determination that the operation performs on the second side.

According to one of the exemplary embodiments, the processor is configured to determine whether the operation is a double tap operation comprising a first tap and a second tap according to contact times and a positioning information of the first tap and the second tap on the first side or the second side detected by the sensors.

According to one of the exemplary embodiments, the processor is configured to determine the operation comprises the first tap in response to the contact time of the first tap being within a time range and a position difference between a down event and an up event of the first tap on the first side or the second side being less than a distance threshold, and determine the operation comprises the second tap in response to the contact time of the second tap being within the time range, the position difference of the second tap between a down event and an up event being less than the distance threshold and a time difference between the contact times of the second tap and the first tap being less than a time threshold.

According to one of the exemplary embodiments, the processor is configured to determine the operation comprises the first tap in response to the contact time of the first tap being within a time range and a position difference between a down event and an up event of the first tap being less than a distance threshold, and determine the operation comprises the second tap in response to the contact time of the second tap is larger than a threshold.

According to one of the exemplary embodiments, the operation is a sliding operation, and the processor is configured to determine whether the operation is the sliding operation according to a contact time and a position information of touch input of the operation.

According to one of the exemplary embodiments, the operation is a tap operation, and the processor is configured to determine the position of the operation according to a last tap position of the tap operation.

According to one of the exemplary embodiments, the user interface comprises a plurality of icons and the operation is a tap operation. The processor is configured to highlight one of the icons corresponding to a last tap position of the tap operation, and highlight another one of the icons in response to the last tap position moving to the another one of the icons.

According to one of the exemplary embodiments, the user interface comprises a plurality of icons and the operation is a tap operation, and the processor is configured to select an icon from the icons in response to a last touch input being released corresponding to the selected icon. The selected icon corresponds to a position of the last touch input upon being released.

In one of the exemplary embodiments, the method for operating a handheld device is provided. The handheld device includes, but not limited to, a body, one or more sensors respectively disposed on at least one side of the body, and a display. The method includes the following steps. An operation is received through the one or more sensors. A position of the operation on at least one side of the body is determined according to sensing data generated by the sensors. A user interface corresponding to the position is displayed by the display.

According to one of the exemplary embodiments, the method further comprises the following step. Displaying the user interface on a display of the handheld device in a full screen mode. Scaling the user interface in a one-handed mode in response to receiving the operation through the sensors.

In one of the exemplary embodiments, the non-transitory computer readable recording medium records computer program to be loaded by a processor of a handheld device having one or more sensors disposed on at least one side thereof to execute the aforementioned method.

To make the above features and advantages of the disclosure more comprehensible, several embodiments accompanied with drawings are described in detail as follows.

It should be understood, however, that this Summary may not contain all of the aspects and embodiments of the present disclosure, is not meant to be limiting or restrictive in any manner, and that the invention as disclosed herein is and will be understood by those of ordinary skill in the art to encompass obvious improvements and modifications thereto.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1:
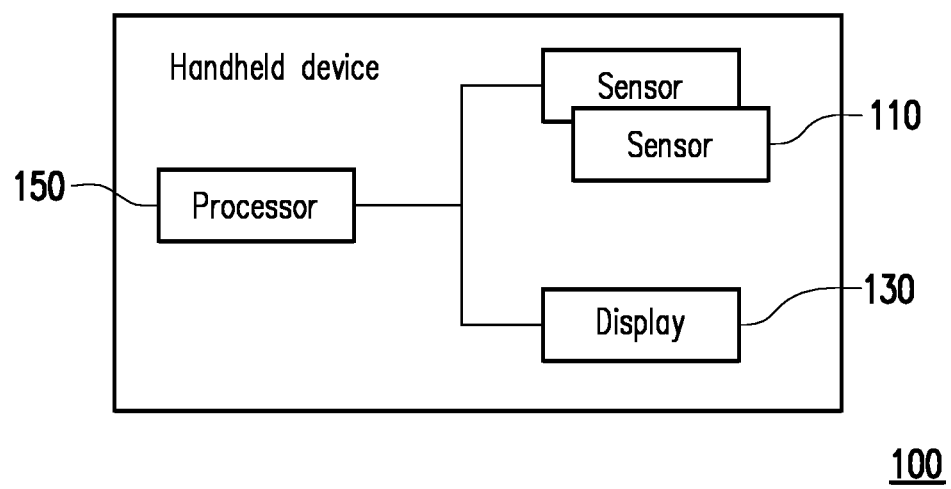
FIG. 1 is a block diagram illustrating a handheld device according to one of the exemplary embodiments of the disclosure.

Reference will now be made in detail to the present preferred embodiments of the invention, examples of which are illustrated in the accompanying drawings. Wherever possible, the same reference numbers are used in the drawings and the description to refer to the same or like parts.

Referring to FIG. 1, FIG. 1 is a block diagram illustrating a handheld device 100 according to one of the exemplary embodiments of the disclosure. The handheld device 100 at least includes, but not limited to, one or more sensors 110, a display 130 and a processor 150. The handheld device 100 could be a mobile phone, a tablet PC, a camera, a handheld game console, a multimedia player, a GPS device, etc.

Figure 2A:
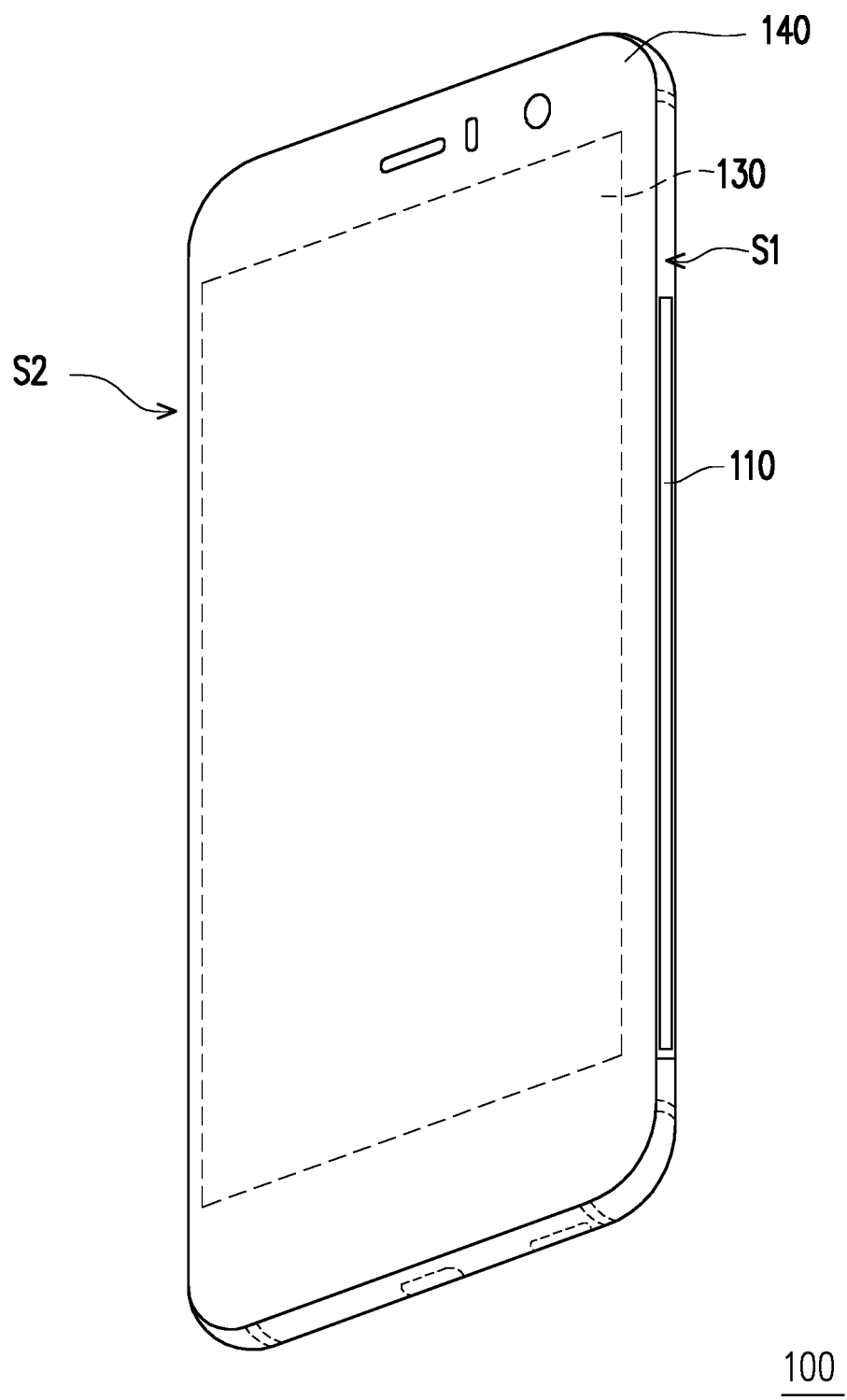
FIGS. 2A and 2B are schematic diagrams illustrating a handheld device according to one of the exemplary embodiments of the disclosure.
Figure 2B:
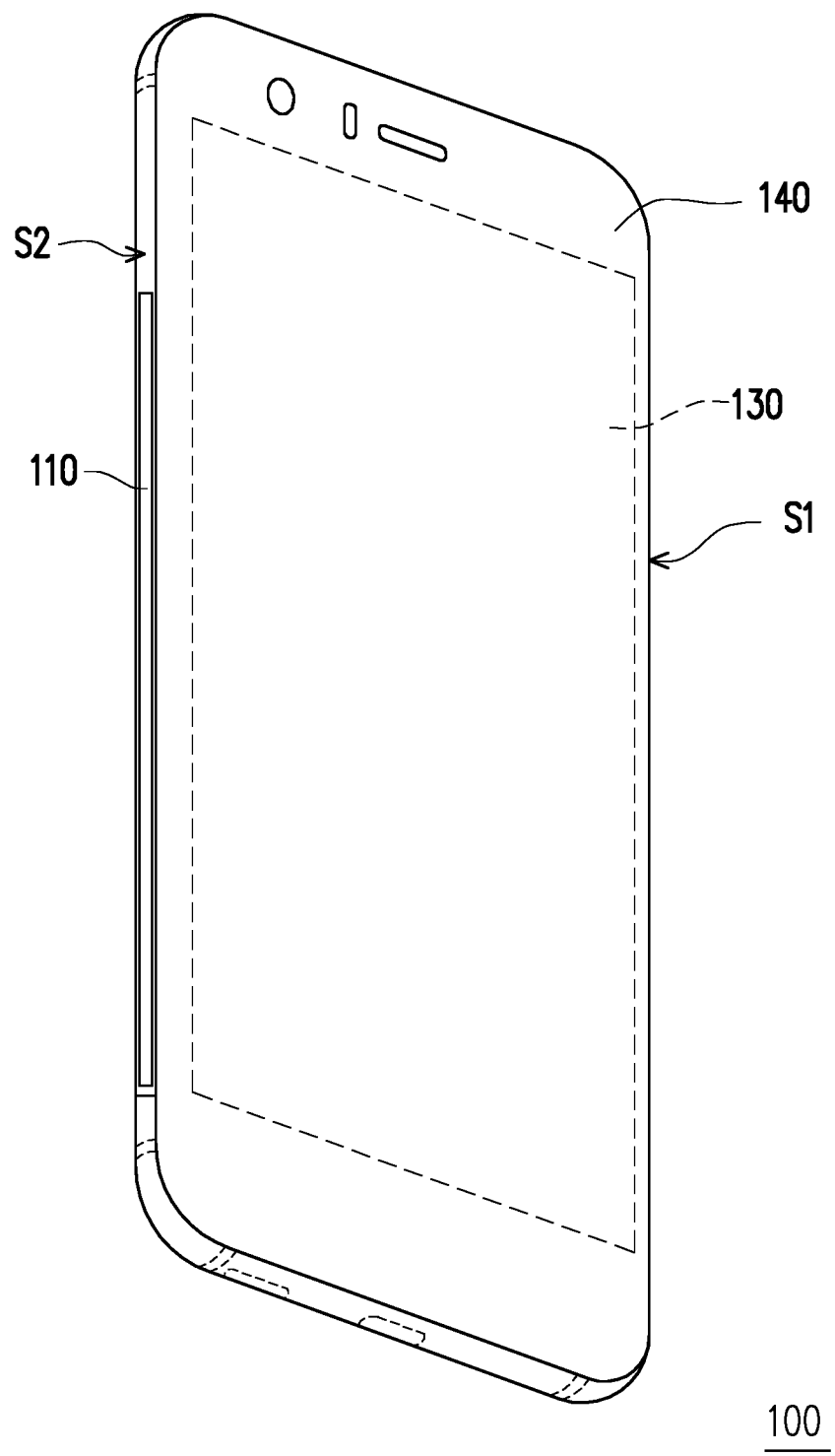

Referring to FIGS. 2A and 2B, one sensor 110 is disposed on a first side S1 of body 140 of the handheld device 100, and the other sensor 110 is disposed on a second side S2 of the body 140, where the second side S2 is opposite to the first side S1. In this embodiment, the first side S1 of the body 140 is the right side of the body 140, and the second side S2 is the left side of the body 140. The sensors 110 could be capacitive sensors, resistive sensors, piezoelectric sensors, ultrasonic sensors, infrared sensors, optical sensor, other type of pressure sensors, or a combination of aforesaid sensors, to detect the presence of objects (e.g. finger, or clamp) being placed on the first side S1 and the second side S2, and generate sensing data including touch position, force or pressure related raw data.

It should be noticed that, the sensors 110 may cover a portion or entire of the first and second sides S1, S2, and each sensor 110 may include a piece of sensing element or multiple sensing elements arranged on the corresponding side S1, S2 of the body 140 with single type sensor or various type of the above mentioned sensors. If the sensing elements are arranged in one-dimension along a line, the sensing data of the sensing elements can be used for detecting a touch length of object (e.g. finger, clamp, or other object). If the sensing elements are arranged in two-dimension, the sensing data of the sensing elements can be used for detecting a touch area of object (e.g. finger, clamp, or other object). It should be noticed that, the shapes and dimension formed by the arranged sensing elements on sides S1 and S2 can be modified according to actual requirement, and the exemplary embodiment of the disclosure is not limited thereto.

In addition, two sensors 110 are disposed at two sides S1 and S2 in FIGS. 2A and 2B. However, in accordance with different design requirement, the number and disposed position of sensor 110 is changeable, and the disclosure is not limited thereto. For example, merely one sensor 110 is disposed at side S1, or more sensors 110 are disposed at least one side of the body 140.

The display 130 could be a liquid crystal display (LCD), light emitting diode (LED), organic light emitting diode (OLED), or other type of display. Two sides of the display 130 locates near two sides S1, S2 of the body 140 as shown in FIGS. 2A and 2B. In one exemplary embodiment, the display 130 may be integrated with touch panel (including touch sensor such as resistive touch sensor, capacitive touch sensor, optic touch sensor or the likes), so as to provide display and touch sensing functions.

The processor 150 is coupled to the two sensors 110 and display 130. The processor 150 may be implemented by using a programmable unit, such as a central processing unit (CPU), a micro-processor, a micro-controller, a digital signal processing (DSP) chip, a field programmable gate array (FPGA), and so on. The function of the processor 150 may also be implemented by an independent electronic device or an integrated circuit (IC), and the operation of the processor 150 may also be implemented by software. The processor 150 is programmed to execute the functions or steps that would be described below.

In order to make the operation process of the embodiment of the disclosure more comprehensible, several embodiments are provided below to describe in detail the operations of the handheld device 100 in the embodiment of the disclosure.

Figure 3:
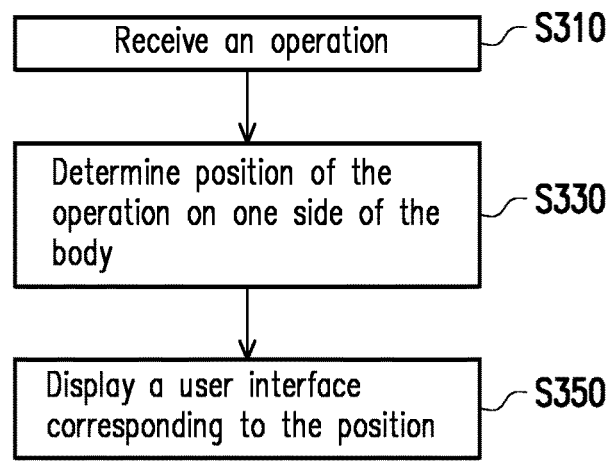
FIG. 3 is a flowchart illustrating a method for operating the handheld device according to one of the exemplary embodiments of the disclosure.

FIG. 3 is a flowchart of a method for operating the handheld device 100 according to one of exemplary embodiments of the disclosure. Referring to FIG. 3, the method of this embodiment is adapted for the handheld device 100 of FIGS. 1, 2A and 2B. In the following paragraphs, the method of this embodiment of the disclosure is described with reference to the components of the handheld device 100. Nevertheless, the processes of this method may be adjusted according to the actual needs and thus are not limited to the following.

The processor 150 obtains sensing data generated by the one or more sensors 110. The processor 150 may analyze the raw data (such as strength value and corresponding position) included in the sensing data, to determine the number, position, force and pressure of objects (e.g. finger or clamp) detected or applied on at least one side of the body 140, so as to receive an operation through the one or more sensors 110 (Step S310). Specifically, in general, when user holds the body 140 of the handheld device 100, the thumb and/or palm abuts against one side S1/S2 of the body 140, and at least one of the other fingers abuts against the other side S2/S1 of the body 140. The user can tap, multiple-tap, slide or squeeze on one or two sides S1, S2 of body 140. In the exemplary embodiments of the disclosure, these actions (such as one-tap, double-tap, slide, squeeze, etc.) can be configured as actuating operations.

Figure 4:
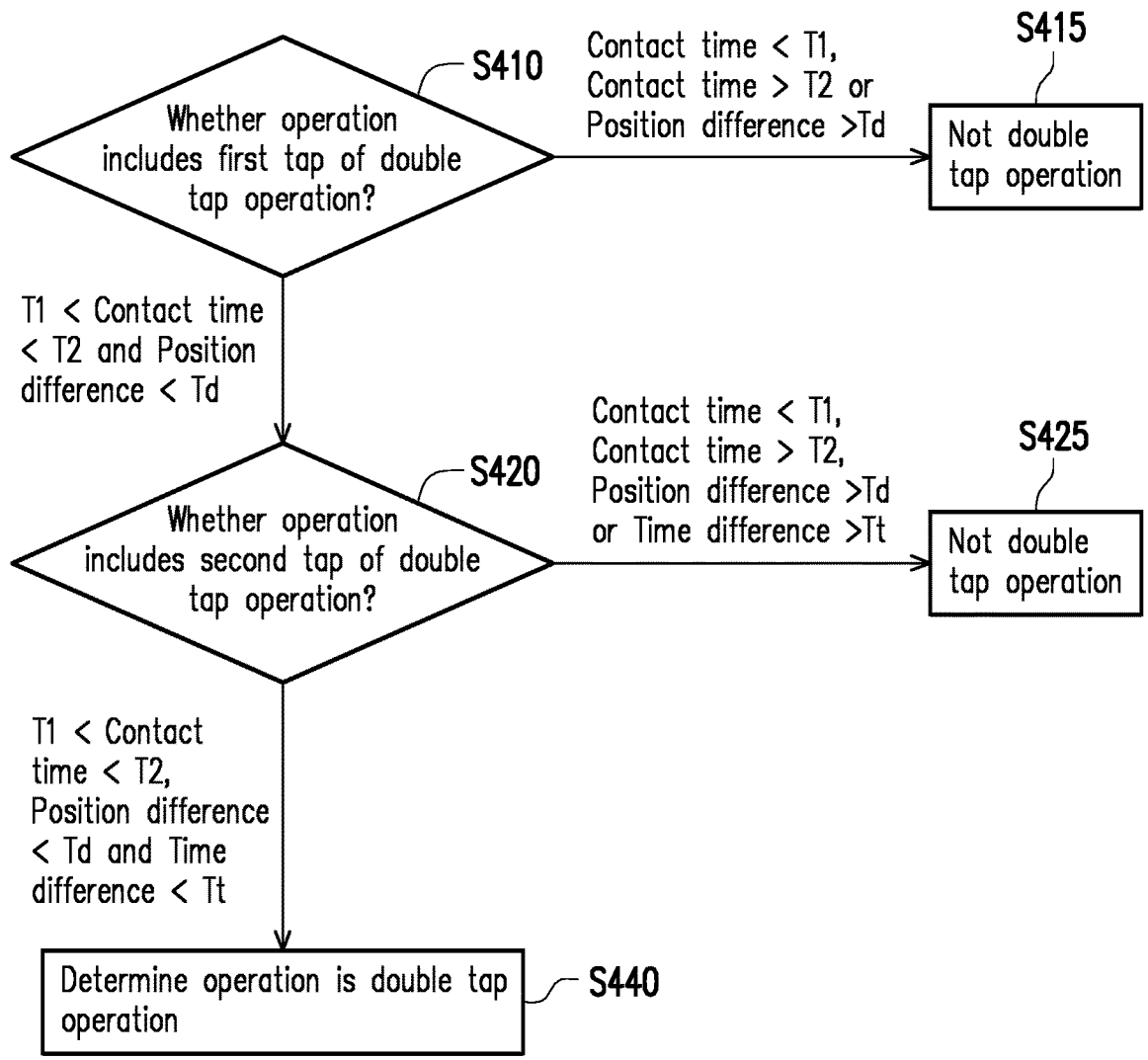
FIG. 4 is a flowchart illustrating a procedure of the handheld device for determining a double tap operation according to one of the exemplary embodiments of the disclosure.
Figure 5A:
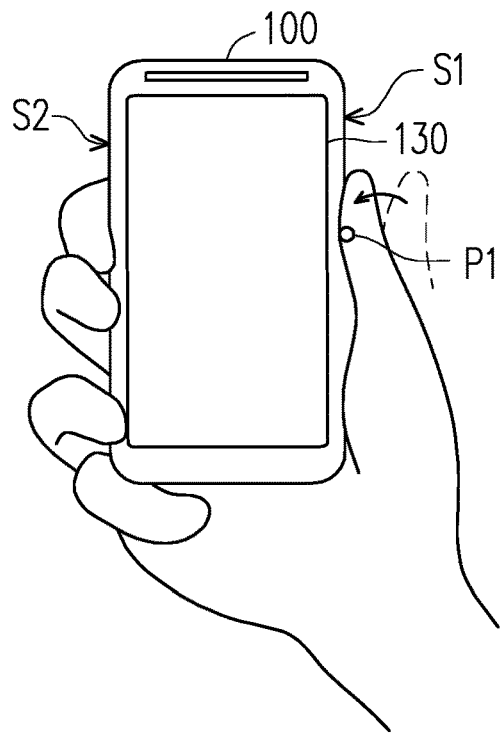
FIGS. 5A and 5B are schematic diagrams illustrating one tap on the handheld device.
Figure 5B:
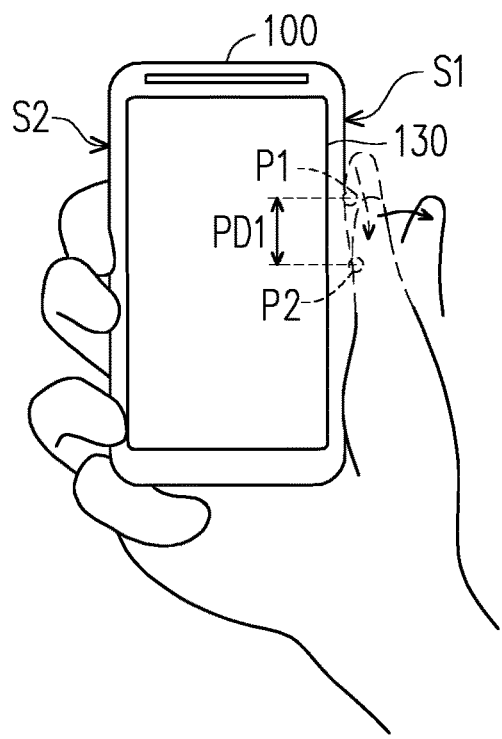

In one exemplary embodiment, the processor 150 configures the actuating operation is a double tap operation including a first tap and a second tap, and determines whether the operation according to sensing data generated by the one or more sensors 110 according to contact times, a position information, and a time difference between the contact times of the second tap and the first tap on at least one side detected by the sensors 110. Referring to FIG. 4, FIG. 4 is a flowchart illustrating a procedure of the handheld device 100 for determining the double tap operation according to one of the exemplary embodiments of the disclosure. Firstly, the processor 150 may determine whether the operation includes the first tap according to a contact time and a position difference between down and up events of a first touch input of the operation (Step S410). Referring to FIGS. 5A and 5B, in general, when a user performs double tap operation on one side S1 of body 140 by one finger (which may be thumb as shown in the drawing), the first tap would be the finger contacts with the side S1 (as shown in FIG. 5A) and then leaves from the side S1 (as shown in FIG. 5B). The contact time is the duration between the finger first contacts with the side S1 and leaves from the side S1, and the processor 150 can record how much time a first touch input caused by the contact of the finger takes to be detected on the side S1, to determine the contact time. However, if the contact time of a touch input is less than a threshold T1, the touch input would be considered as an accidental touch; if the contact time of a touch input is larger than a threshold T2 (larger than the threshold T1), the touch input may be considered as a long press.

In addition, the position information of the first tap could be a position difference between down and up events of the first touch input of the operation. When the first touch input is first detected on one side S1/S2 of the body 140 by a corresponding sensor 110, the processor 150 may generate the down event, and the sensor 110 detects the position P1 of the first touch input (as shown in FIG. 5A). After that, when the finger leaves from the S1, the first touch input is released and the processor 150 may generate the up event. The processor 150 records the position P2 where the first touch input is released (as shown in FIG. 5B). The processor 150 may calculate the position difference PD1 between the two positions P1 and P2 caused by the generations of the down and up events. However, if the position difference PD1 is larger than a distance threshold Td, the touch input would be considered as a move or a slide input. Accordingly, if the contact time of the first touch input is less than the threshold T1, if the contact time of the first touch input is larger than the threshold T2, or if the position difference PD1 corresponding to the first touch input is larger than the distance threshold Td, the processor 150 may determine the operation is not the double tap operation (Step S415), and the step would turn back step S410 to analyze the subsequent touch input.

On the other hand, if the contact time is between the thresholds T1 and T2 (i.e. within a time range from T1 to T2) and the position difference PD1 is less than the distance threshold Td, the processor 150 may determine the operation includes the first tap of the double tap operation, and then determine whether the operation further includes a second tap of the double tap operation (Step S420). In this embodiment, the processor 150 also use the contact time and a position difference of between a down event and an up event of a second touch input (subsequent to the first touch input) caused by another contact of the finger to determine the second tap as same as the determination of the first tap. In addition, the processor 150 further determine a time difference between the contact times of the second touch input and the first tap determined by the Step S410 corresponding to the first touch input. In general, when a user performs the double tap operation on one side S1/S2 of the body 140, the behavior of the second tap could be almost the same as the behavior of the first tap, and the contact times of the two taps are very close. Accordingly, if the contact time of the second touch input is less than the threshold T1, if the contact time of the second touch input is larger than the threshold T2, if the position difference PD1 corresponding to the second touch input is larger than the distance threshold Td, or the time difference between the second touch input and the first tap is larger than a time threshold Tt, the processor 150 may determine the operation is not the double tap operation (Step S425), and the step would turn back step S410 to analyze the subsequent touch input. On the other hand, if the contact time is between the thresholds T1 and T2, the position difference PD1 is less than the distance threshold Td and the time difference is less than the time threshold Tt, the processor 150 may determine the operation includes the second tap of the double tap operation, and further determine the operation is the double tap operation (Step S440).

It should be noticed that, in some embodiments, the processor 150 may first further determine the force of the touch input applied on one side S1/S2 of the body 140 is larger than a force threshold to confirm that the touch input is not an accidental touch, and then determine the contact time and the position difference as described in the procedure of FIG. 4. In addition, two taps of the previous embodiment is considered as almost the same behavior, which is two taps both leave from the side S1 or S2 within the time range. In another exemplary embodiment, the processor 150 use another mechanism because of a consideration of different behavior of two taps, which is the second tap would not leave from the side S1 or S2 within the time range.

Figure 6:
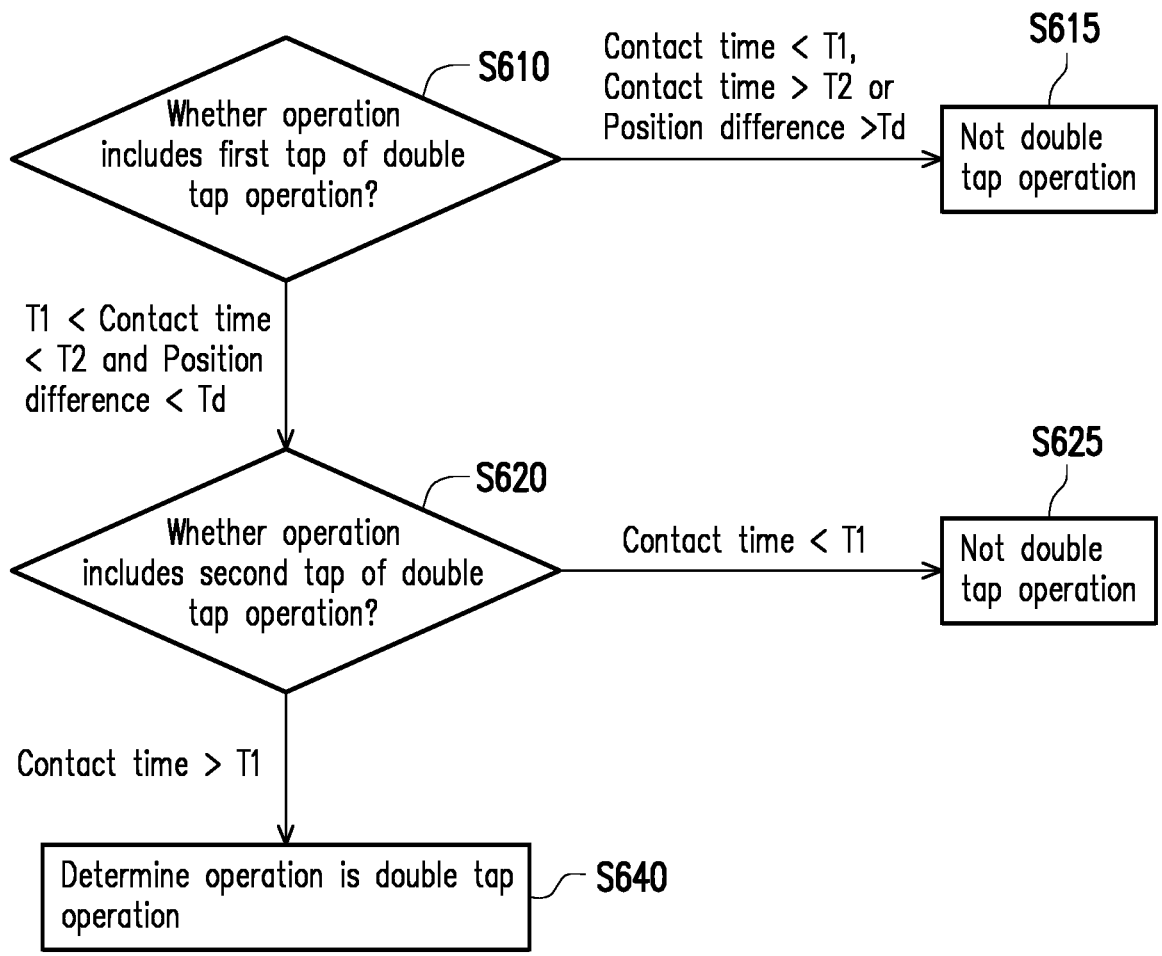
FIG. 6 is a flowchart illustrating another procedure of the handheld device for determining a double tap operation according to one of the exemplary embodiments of the disclosure.
Figure 7A:
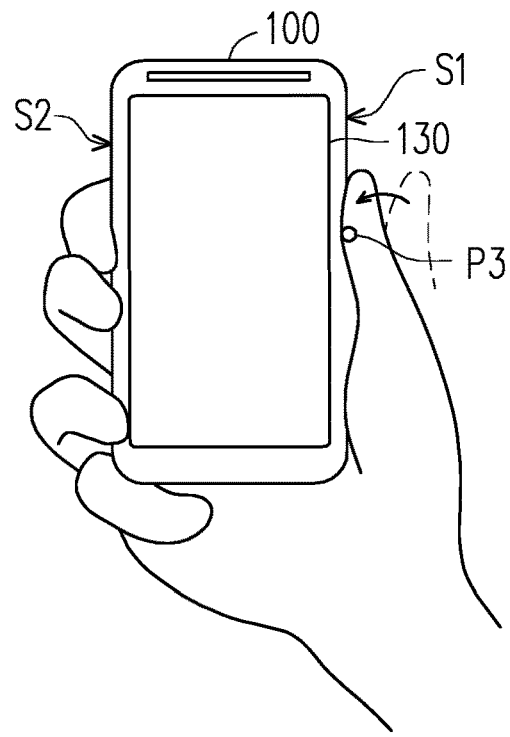
FIGS. 7A and 7B are schematic diagrams illustrating one tap on the handheld device.
Figure 7B:
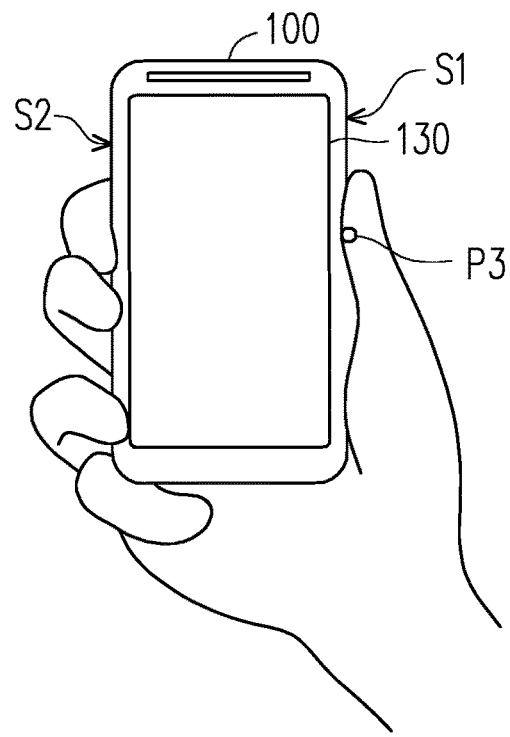

Referring to FIG. 6, FIG. 6 is a flowchart illustrating another procedure of the handheld device 100 for determining the double tap operation according to one of the exemplary embodiments of the disclosure. The processor 150 determines whether the operation is the double tap operation according to contact times of the first tap and the second tap on the side and a position information of the first tap and the second tap. The detail description of steps S610 and S615 can be referred to the steps S410 and S415, respectively. The difference between the embodiments of FIGS. 4 and 6 is that the second tap of this embodiment is a long press. Referring to FIGS. 7A and 7B, after the thumb contacts with the side S1 (as shown in FIG. 7A), and thumb would keep contacting with the side S1 (as shown in FIG. 7B). Accordingly, if the operation includes a first tap of the double tap operation, the processor 150 may further determine whether the operation includes a second tap of the double tap operation according to a contact time of a second touch input subsequent to the first tap of the operation (Step S620). The position P3 of the second touch input may not be used for the determination in this embodiment. If the contact time of the second touch input is less than a threshold T1, the processor 150 would determine the operation is not the double tap operation (Step S625). On the other hand, if the contact time of the second touch input is larger than the threshold T1, the processor 150 would determine the operation includes the second tap of the double tap operation, and further determine the operation is the double tap operation (Step S640).

Figure 8A:
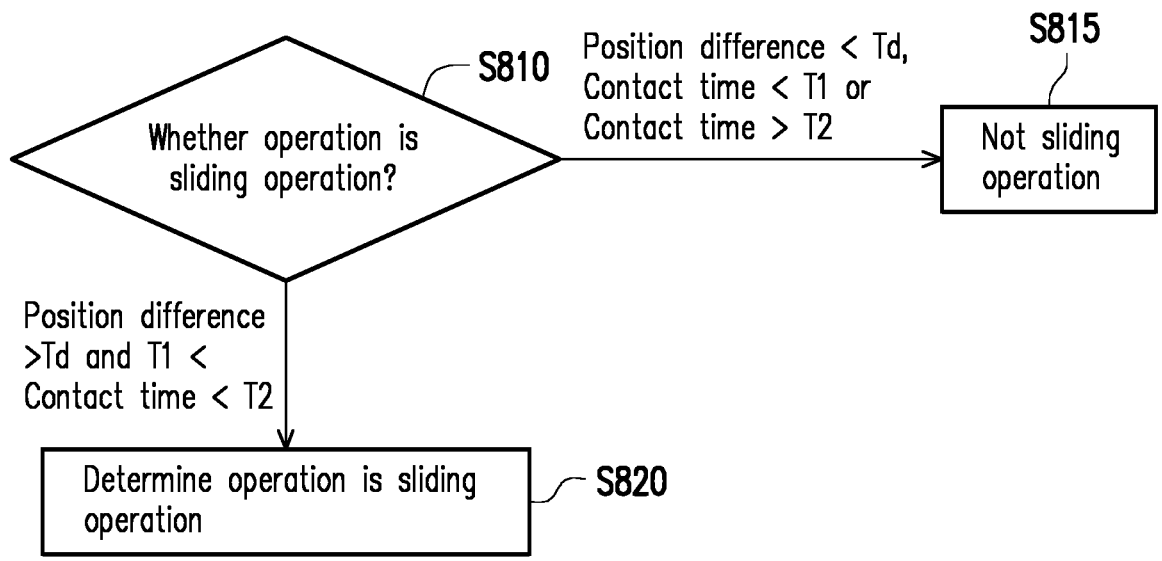
FIG. 8A is a flowchart illustrating a procedure of the handheld device for determining a sliding operation according to one of the exemplary embodiments of the disclosure.
Figure 8B:
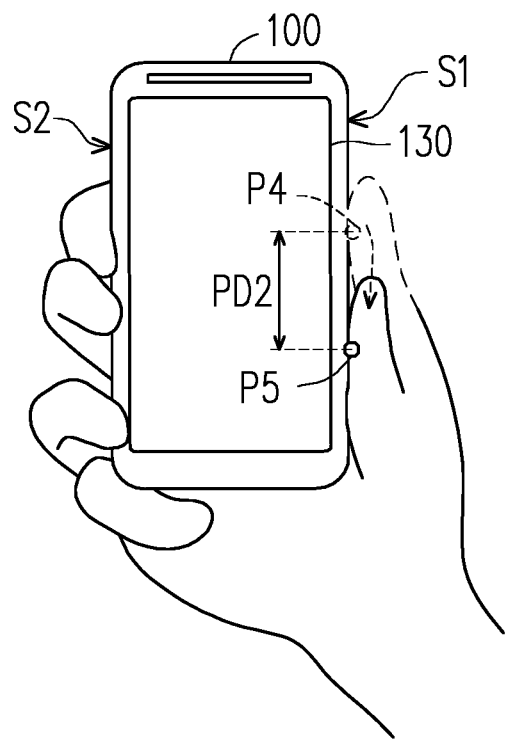
FIG. 8B is a schematic diagram illustrating the sliding operation on the handheld device.

In further exemplary embodiment, the processor 150 may configure the actuating operation is a sliding operation. The processor 150 would determine whether the operation is the sliding operation according to sensing data of the sensors. Referring to FIG. 8A, FIG. 8A is a flowchart illustrating a procedure of the handheld device for determining the sliding operation according to one of the exemplary embodiments of the disclosure. In general, the sliding operation may be a move of a finger on a side S1/S2 of body 140. The processor 150 may determine whether the operation is the sliding operation according to a contact time and a position difference between down and up events of a touch input of the operation (i.e., position information) (Step S810). Referring to FIG. 8B, when a user perform the sliding operation on a side S1 of body 140 by one finger (which may be thumb as shown in the drawing), the processor 150 would record the displacement of the finger moving on the side S1 (i.e. a position difference PD2 between the position P4 (of the down event of the touch input) and position P5 (of the same touch input leaving from the position P4). If the position difference PD2 of a touch input is less than distance threshold Td or the contact time of the touch input is less than threshold T1, the touch input would be considered as a tap or an accidental touch. In addition, if the contact time of the touch input is larger than a threshold T2 (larger then threshold T1), the touch input would be considered as a long press. Accordingly, if the position difference PD2 is less than a distance threshold Td before the up event of the touch input is generated, if the contact time is less than the threshold T1, or if the contact time is larger than the threshold T2, the processor 150 may determine the operation is not the sliding operation (Step S815), and the step would turn back step S810 to analyze the subsequent touch input. On the other hand, if the contact time is between the thresholds T1 and T2 and the position difference PD2 is larger than the distance threshold Td before the up event of the touch input is generated, the processor 150 may determine the operation is the sliding operation (Step S820).

Figure 9A:
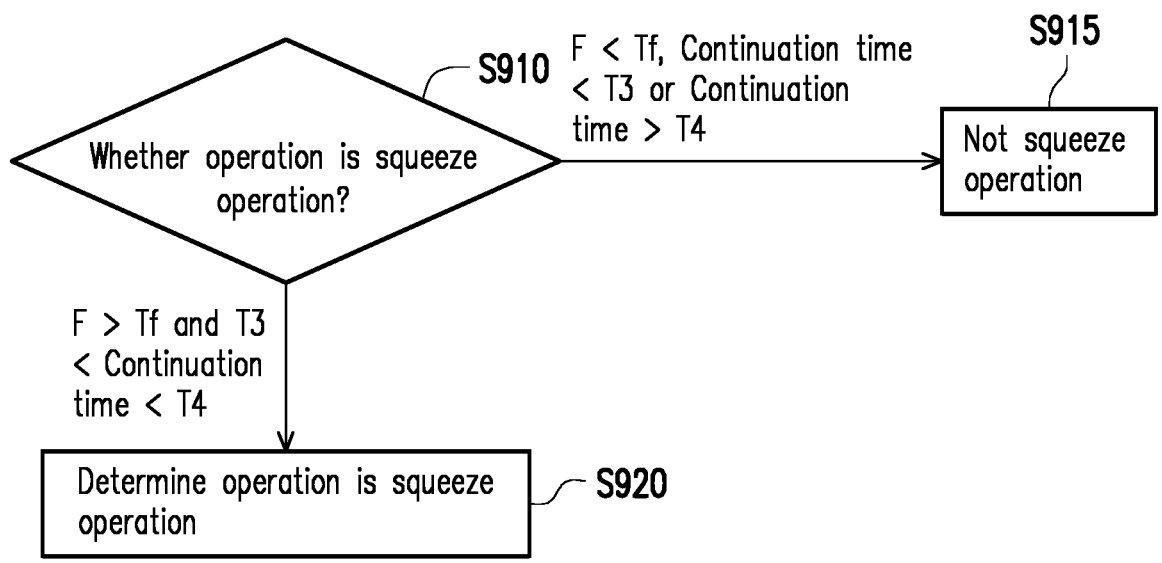
FIG. 9A is a flowchart illustrating a procedure of the handheld device for determining a squeeze operation according to one of the exemplary embodiments of the disclosure.
Figure 9B:
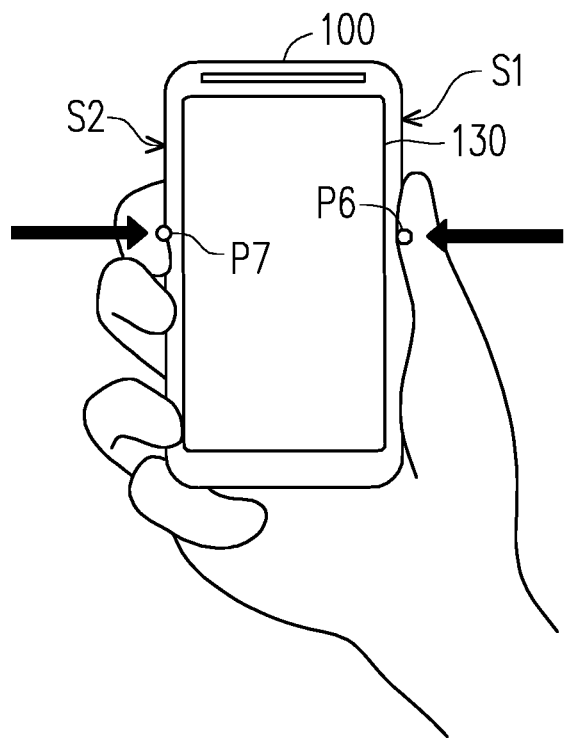
FIG. 9B is a schematic diagram illustrating the squeeze operation on the handheld device.

In still another exemplary embodiment, the processor 150 may configure the actuating operation is a squeeze operation. The processor 150 would determine whether the operation is the squeeze operation according to sensing data of the sensors. Referring to FIG. 9A, FIG. 9A is a flowchart illustrating a procedure of the handheld device for determining a squeeze operation according to one of the exemplary embodiments of the disclosure. In general, the squeeze operation may be that fingers press on two sides S1 and S2 of body 140, respectively. The processor 150 may determine whether the operation is the squeeze operation according to a continuation time and a force of a touch input of the operation (Step S910). Referring to FIG. 9B, when a user perform the squeeze operation on two sides S1 and S2 of body 140 by fingers (which may be thumb and index finger located at positions P6 and P7 as shown in the drawing), the processor 150 would determine the forces applied by two fingers on the sensor 110. If the forces are less than a force threshold Tf, the touch inputs would be considered as being corresponding to a hold behavior. When at least one force is larger than a force threshold, the processor 150 records how much time the force takes is larger than the force threshold Tf, to determine the continuation time of the touch inputs. In other words, the continuation time is a duration of the force being larger than the force threshold Tf. Accordingly, if the forces of the touch inputs of the operation are less than the force threshold Tf, if the continuation time is less than the threshold T3, or if the continuation time is larger than the threshold T4, the processor 150 may determine the operation is not the squeeze operation (Step S915), and the step would turn back step S910 to analyze the subsequent touch input. On the other hand, if the continuation time is between the thresholds T3 and T4 and at least one the force of the touch inputs is larger than the force threshold Tf, the processor 150 may determine the operation is the squeeze operation (Step S920).

It should be noticed that, there may be other actions of fingers that can be configured as the actuating operation, and those of ordinary skill in the art can modify the actuating operation based on actual situation. In addition, the processor 150 can provide a setting to modify the actuating operation and those thresholds for users.

Furthermore, the processor 150 may determine the operation performs on the first side S1 or the second side S2 according to sensing data generated by the sensors 110. The force applied on side S1/S2 or touch area/length detected on side S1/S2 could be the reference to determine which side receives the operation. For example, the processor 150 determines whether a force of the operation applied on one side S1/S2 is larger than a threshold.

If the operation detected by the sensor 110 is the actuating operation, back to FIG. 3, the processor 150 would determine a position of the operation (which may be called as actuation position) on one side S1/S2 of the body 140 (Step S330). Different actuating operations may correspond to different actuating positions. If the operation is a tap operation (such as one tap operation, two tap operation, etc.), the processor 150 determine the position of the operation according to a last tap position of the tap operation. For example, referring to FIG. 5B, the actuating position would be the position P2 of the last touch input of the double tap operation (i.e., the last tap position) upon being released. Referring to FIG. 7B, the actuating position would be the position P3 of the last touch input of the double tap operation (i.e., the last tap position) which is not released. For other actuating operation, the actuating position relates to the touch input of the operation. Referring to FIG. 8B, the actuating position would be a position between the positions P4 and P5 of the touch input of the sliding operation. Referring to FIG. 9B, the actuating position would be the position P6 of the touch input (caused by the thumb) of the squeeze operation. It should be noticed that, in other embodiments, the actuating position may be fixed or corresponding to the position of any finger based on actual situation.

Figure 10A:
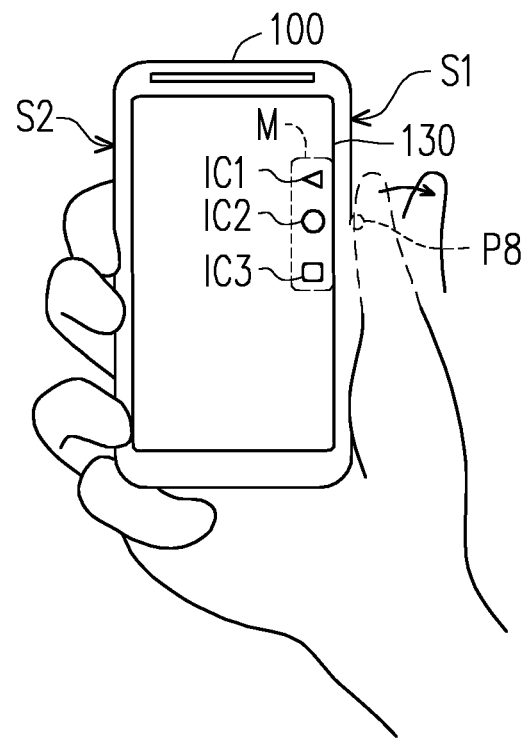
FIG. 10A-10C are schematic diagrams illustrating operations on user interface.

Then, the processor 150 displays a user interface corresponding to the actuating position through the display 130 (Step S350). Specifically, the user interface could be a menu, a navigation bar, a window of virtual keyboard, a toolbar, a widget, a setting, or app shortcuts, and the user interface may include multiple icons. On the basis of the determination of the side S1/S2 where the operation is detected, the processor 150 displays the user interface adjacent to the first side in response to a determination that the operation performs on the first side S1, or displays the user interface adjacent to the second side S2 in response to a determination that the operation performs on the second side S2. Taking the navigation bar as an example, referring to FIG. 10A, the navigation bar is trigger by the embodiments of FIG. 4 which is the double tap operation and FIG. 8A which is the sliding operation, where the finger would leave from the side S1 at the end of the operation. Taking the sliding operation as an example, the last detected position P8 of the sliding operation in FIG. 8B would be determined as the actuating position, the display 130 displays the the navigation bar M (including three icons IC1~IC3 which are 'back', 'home' and 'recent app' virtual buttons) next to the positions P2 or P8. The navigation bar M is near to the edge of the display 130. The processor 130 then determines which icon IC1, IC2 or IC3 is selected by an object (such as a finger, a touch pen, etc.) on the display 130 through a touch panel, and performs a function corresponding to the selected icon IC1, IC2 or IC3.

Figure 10B:
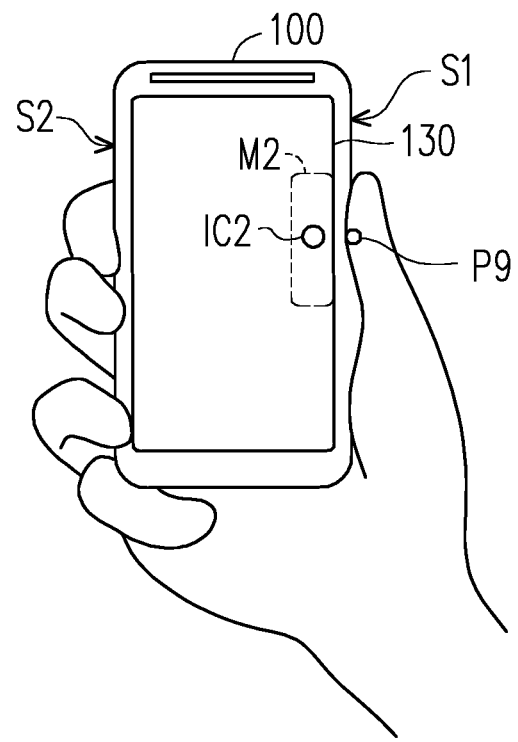
Figure 10C:
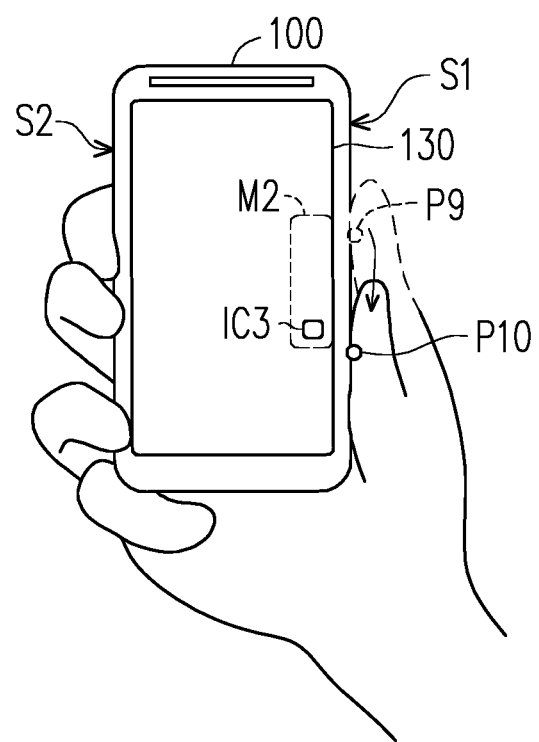

Referring to FIG. 10B, the navigation bar is trigger by the embodiments of FIG. 6 which is another double tap operation and FIG. 9A which is the squeeze operation, where the finger would not leave from the side S1 at the end of the operation. Taking the squeeze operation as an example, the last detected position P9 of the squeeze operation in FIG. 9B would be determined as the actuating position, the display 130 displays the the navigation bar M2 next to the position P9. In this embodiment, the display 130 may highlight one of the icons or indicators corresponding to a current position of the last touch input, and highlight another one of the icons or indicators in response to the current position of the last touch input moving to the another one of the icons or indicators. The way to highlight icon or indicator could be, merely showing the icon corresponding the position of the touch input, enlarging the icon corresponding the position of the touch input, or changing color, brightness or pattern of the icon corresponding the position of the touch input. For example, when the position P9 is detected by the sensor 110, the processor 150 only displays the icon IC2 of the navigation bar M2 next to the position P9 via the display 130. If the thumb leaves the position P9 and moves to the current position P10 as shown in FIG. 10C, the processor 150 only presents the icon IC3 of the navigation bar M2 next to the position P10, and the icon IC2 would be invisible on the display 130. Then, the processor 130 determines which icon IC1, IC2 or IC3 is selected according to the position of the up event of the last touch input, and performs a function corresponding to the selected icon. In other words, the processor 150 selects an icon from the icons IC1~IC3 if the last touch input being released corresponding to the icon, and the selected icon corresponds to the position of the last touch input upon being performed. For example, the thumb leaves form the side S1 at the position P10 corresponding to the icon IC3, then the processor 150 would perform the recent app.

It should be noticed that, if the actuating operation is a tap operation (such as one tap, double tap operation, etc.), the aforementioned position of the last touch input would be a last tap position of the tap operation. For example, position P2 in FIG. 5B or position P3 in FIG. 7B.

Furthermore, the operation on at least one side of the handheld device 100 can be configured to modify the position and the size of a user interface on the display 130. In one exemplary embodiment, the display 130 displays the user interface in a full screen mode and scales the user interface in a one-handed mode in response to receiving the operation through the sensors 110. In the full screen mode, the display 130 displays the user interface UI on the whole screen of the display 130. In the one-handed mode, the display 130 displays the user interface UI occupied a certain ratio (e.g., 50, 60, 70%) of the screen of the display 130, so that the user can reach all of the user interface without overstretching fingers.

Figure 11A:
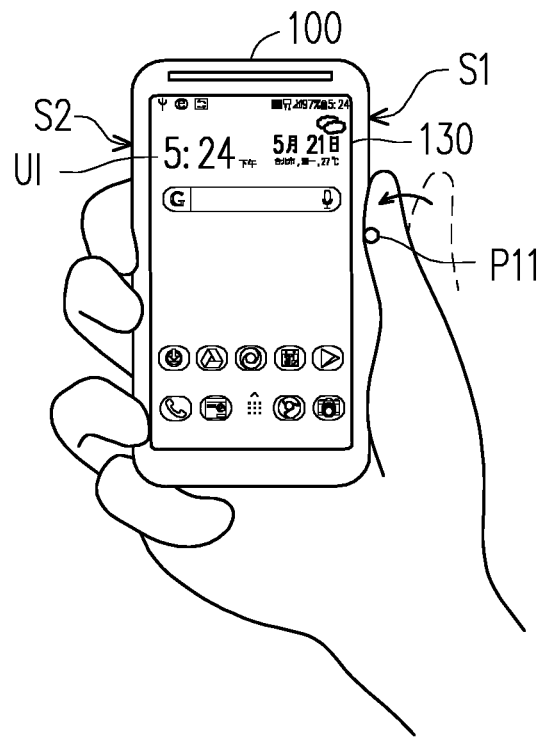
FIG. 11A-11B are schematic diagrams illustrating operations on user interface.
Figure 11B:
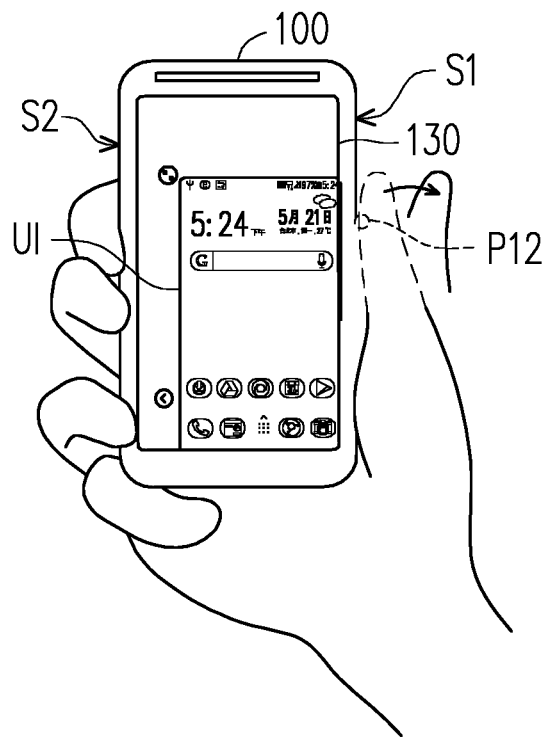

Referring to FIGS. 11A-11B are schematic diagrams illustrating operations on user interface. The display 130 displays the user interface UI in the full screen mode as shown in FIG. 11A, and the sensor 110 detects a position P11 of a one tap or a double tap operation on the first side S1. Accordingly, the processor 150 makes the handheld device 100 to enter the one-handed mode as shown in FIG. 11B in order to scale down the user interface UI and display the user interface UI adjacent to the side S1 corresponding to the position P11. After entering the one-handed mode, the processor 150 may further determine whether a subsequent tap operation is received on the side S1/S2. If the subsequent tap operation is received, the processor 150 scales up the user interface UI so as to back the full screen mode.

It should be noticed that, the user interface UI shown in FIG. 11B is scaled down with the same length-width ratio of the user interface UI shown in FIG. 11A. However, in other embodiments, the length-width ratios of the user interfaces UIs of one-handed mode and the full screen mode could be different.

The disclosure also provides a non-transitory computer readable recording medium, which records computer program to be loaded into a processor disposed in a handheld device having one or more sensors disposed on at least one side thereof to execute the steps of the proposed method. The computer program is composed of a plurality of program instructions (e.g. an organization chart, establishing program instruction, a table approving program instruction, a setting program instruction, and a deployment program instruction). Once the program sections are loaded into the handheld device and executed by the same, the steps of the proposed method would be accomplished.

In summary, the exemplary embodiments described above depicted an operating method and a handheld device thereof. The handheld device is configured to determine whether an operation is the specific actuating operation through at least one sensor disposed on one or two long-sides of the handheld device. Then, a user interface including multiple icons can be presented corresponding to the actuating position of the actuating operation. Accordingly, a convenient function for one hand operation is provided.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A handheld device, comprising:
   a body;
   one or more sensors, disposed on at least one side of the body;
   a display; and
   a processor, coupled to the sensors and the display, and configured for:
      receiving an operation through the sensors;
      determining a position of the operation on the at least one side of the body according to sensing data generated by the sensors; and
      displaying a user interface corresponding to the position by the display,
      wherein the user interface comprises a plurality of icons and the operation comprises a tap operation, and the processor is configured for:
         selecting an icon from the icons in response to a touch input being released corresponding to the icon; and
         performing a function corresponding to the selected icon.

2. The handheld device according to claim 1, wherein the sensors are disposed on a first side and a second side of the at least one side, the first side is opposite to the second side, and the processor is configured for:
   determining the operation performs on the first side or the second side according to the sensing data generated by the sensors; and
   displaying the user interface adjacent to the first side by the display in response to a determination that the operation performs on the first side, or displaying the user interface adjacent to the second side by the display in response to a determination that the operation performs on the second side.

3. The handheld device according to claim 2, wherein the processor is configured for:
   determining whether the operation comprises a double tap operation comprising a first tap and a second tap according to contact times and a positioning information of the first tap and the second tap on the first side or the second side detected by the sensors.

4. The handheld device according to claim 3, wherein the processor is configured for:
   determining the operation comprises the first tap in response to the contact time of the first tap being within a time range and a position difference of between a down event and an up event of the first tap on the first side or the second side being less than a distance threshold; and
   determining the operation comprises the second tap in response to the contact time of the second tap being within the time range, the position difference between a down event and an up event of the second tap on the first side or the second side being less than the distance threshold and a time difference between the contact times of the second tap and the first tap being less than a time threshold.

5. The handheld device according to claim 3, wherein the processor is configured for:
   determining the operation comprises the first tap in response to the contact time of the first tap being within a time range and a position difference between a down event and an up event of the first tap being less than a distance threshold; and
   determining the operation comprises the second tap in response to the contact time of the second tap is larger than a threshold.

6. The handheld device according to claim 1, wherein the operation further comprises a sliding operation, and the processor is configured for:
   determining whether the operation comprises a sliding operation according to a contact time and a position information of touch input of the operation.

7. The handheld device according to claim 1, wherein the processor is configured for:
   determining the position of the operation according to a last tap position of the tap operation.

8. The handheld device according to claim 1, wherein the processor is configured for:
   highlighting one of the icons corresponding to a last tap position of the tap operation; and
   highlighting another one of the icons in response to the last tap position moving to the another one of the icons.

9. A method for operating a handheld device, wherein the handheld device comprises a body, one or more sensors disposed on at least one side of the body, and a display, and the method comprises:
   receiving an operation through the sensors;
   determining a position of the operation on the at least one side of the body according to sensing data generated by the sensors; and
   displaying a user interface corresponding to the position by the display,
   wherein the user interface comprises a plurality of icons and the operation comprises a tap operation, and after the step of displaying the user interface corresponding to the position, the method further comprises:
      selecting an icon from the icons in response to a touch input being released corresponding to the icon; and
      performing a function corresponding to the selected icon.

10. The method according to claim 9, wherein the sensors are disposed on a first side and a second side of the at least one side, the first side is opposite to the second side, and the step of determining the position of the operation on the at least one side of the body comprises:
    determining the operation performs on the first side or the second side according to the sensing data generated by the sensors; and
    the step of displaying the user interface corresponding to the position by the display comprises:
    displaying the user interface adjacent to the first side by the display in response to a determination that the operation performs on the first side, or displaying the user interface adjacent to the second side by the display in response to a determination that the operation performs on the second side.

11. The method according to claim 10, further comprising:
    determining whether the operation is comprises double tap operation comprising a first tap and a second tap according to contact times and a position information of the second tap and the first tap on the first side or the second side detected by the sensors.

12. The method according to claim 11, wherein the step of determining whether the operation comprises the double tap operation comprises:

determining the operation comprises the first tap in response to the contact time of the first tap being within a time range and a position difference between a down event and an up event of the first tap on the first side or the second side being less than a distance threshold; and determining the operation comprises the second tap in response to the contact time of the second tap being within the time range, the position difference between a down event and an up event of the second tap on the first side or the second side being less than the distance threshold and a time difference between the contact times of the second tap and the first tap being less than a time threshold.

13. The method according to claim 11, wherein the step of determining whether the operation comprises the double tap operation further comprises:

determining the operation comprises the first tap in response to the contact time of the first tap being within a time range and a position difference between a down event and an up event of the first tap being less than a distance threshold; and determining the operation comprises the second tap in response to the contact time of the second tap is larger than a threshold.

14. The method according to claim 9, further comprising:
determining whether the operation further comprises a sliding operation according to a contact time and a position information of the operation.

15. The method according to claim 9, wherein the step of determining the position of the operation on the at least one side of the body comprises:

determining the position of the operation according to a last tap position of the tap operation.

16. The method according to claim 9, wherein after the step of displaying the user interface corresponding to the position, the method further comprises:

highlighting one of the icons corresponding to a last tap position of the tap operation; and highlighting another one of the icons in response to the last tap position moving to the another one of the icons.

17. The method according to claim 9, further comprising:
displaying the user interface on the display of the handheld device in a full screen mode; and scaling the user interface in a one-handed mode in response to receiving the operation through the sensors.

18. A non-transitory computer readable recording medium, recording computer program to be loaded by the processor of the handheld device of claim 1 having one or more sensors disposed on at least one side thereof to execute steps of:

receiving an operation through the sensors;

determining a position of the operation on at least one side of the handheld device according to sensing data generated by the sensors; and displaying a user interface corresponding to the position, wherein the user interface comprises a plurality of icons and the operation comprises a tap operation, and after the step of displaying the user interface corresponding to the position, the recording computer program is loaded by the processor to execute steps of:

selecting an icon from the icons in response to a touch input being released corresponding to the icon; and performing a function corresponding to the selected icon.

* * * * *